United States Patent
Sugawara et al.

(10) Patent No.: US 12,233,862 B2
(45) Date of Patent: Feb. 25, 2025

(54) DRIVER ASSISTANCE DEVICE TO BE APPLIED TO VEHICLE AT TIMES OF RIGHT- AND LEFT-HAND TURNS

(71) Applicant: SUBARU CORPORATION, Tokyo (JP)

(72) Inventors: Hideki Sugawara, Tokyo (JP); Takahiro Furuya, Tokyo (JP); Anfen Ye, Tokyo (JP); Kazuki Yamaguchi, Tokyo (JP); Wataru Matsudate, Tokyo (JP); Hayato Hori, Tokyo (JP); Takayuki Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 210 days.

(21) Appl. No.: 18/067,450

(22) Filed: Dec. 16, 2022

(65) Prior Publication Data

US 2023/0227033 A1    Jul. 20, 2023

(30) Foreign Application Priority Data

Jan. 20, 2022    (JP) .................................. 2022-007426

(51) Int. Cl.
*B60W 30/095*    (2012.01)
*B60W 30/18*    (2012.01)
*B60W 40/04*    (2006.01)

(52) U.S. Cl.
CPC .. *B60W 30/0956* (2013.01); *B60W 30/18154* (2013.01); *B60W 30/18159* (2020.02);
(Continued)

(58) Field of Classification Search
CPC ....... B60W 30/0956; B60W 30/18154; B60W 30/18159; B60W 40/04; B60W 2554/80;
(Continued)

(56) References Cited

U.S. PATENT DOCUMENTS

| 8,510,025 B2 * | 8/2013 | Chan ..................... H04W 84/00 701/119 |
| 11,465,647 B2 * | 10/2022 | Aoki ........................ B60Q 1/48 |

(Continued)

FOREIGN PATENT DOCUMENTS

JP    2017-140993 A    8/2017

*Primary Examiner* — Mussa A Shaawat
(74) *Attorney, Agent, or Firm* — Rimon P.C.

(57) ABSTRACT

A driver assistance device acquires information about vehicle-driving environment ahead of the vehicle to detect an intersection. Upon determining that the vehicle makes a right- or left-hand turn at the intersection, the driver assistance device sets a projected course of the vehicle and recognizes a moving object ahead in a direction in which the vehicle making a right- or left-hand turn is headed. The driver assistance device calculates a movement vector from positional changes of the moving object to calculate a meeting point of a path of the object and the projected course. When an interval between times at which the vehicle and the moving object reach the meeting point is found to fall within a predetermined range, the driver assistance device determines that there is a possibility of interference between the vehicle and the moving object and then causes the vehicle to halt short of the meeting point.

5 Claims, 6 Drawing Sheets

(52) U.S. Cl.
CPC ......... *B60W 40/04* (2013.01); *B60W 2554/80* (2020.02); *B60W 2555/60* (2020.02)

(58) Field of Classification Search
CPC ....... B60W 2555/60; B60W 2420/403; B60W 30/095; B60W 30/0953; B60W 2050/143; B60W 2554/40; B60W 2554/4045; B60W 2554/408; B60W 10/04; B60W 50/0097; B60W 50/14
See application file for complete search history.

(56) References Cited

U.S. PATENT DOCUMENTS

| | | | |
|---|---|---|---|
| 11,603,039 B2* | 3/2023 | Yamasaki | B60Q 1/52 |
| 11,816,982 B2* | 11/2023 | Oyama | G08G 1/0112 |
| 2017/0225567 A1* | 8/2017 | Tsuda | B60K 35/00 |
| 2018/0173237 A1* | 6/2018 | Reiley | G05D 1/0061 |
| 2019/0375430 A1* | 12/2019 | Emura | G08G 1/16 |
| 2021/0197807 A1* | 7/2021 | Park | B60W 40/105 |
| 2022/0227367 A1* | 7/2022 | Kario | B60W 30/0956 |
| 2023/0166743 A1* | 6/2023 | Heck | B60W 30/09 |

* cited by examiner

DRIVER ASSISTANCE DEVICE TO BE APPLIED TO VEHICLE AT TIMES OF RIGHT- AND LEFT-HAND TURNS

CROSS-REFERENCE TO RELATED APPLICATIONS

The present application claims priority from Japanese Patent Application No. 2022-007426 filed on Jan. 20, 2022, the entire contents of which are hereby incorporated by reference.

BACKGROUND

The disclosure relates to a driver assistance device to be applied to a vehicle at times of right- and left-hand turns. When recognizing an object moving on a road ahead of a point at which the vehicle makes a right- or left-hand turn, the driver assistance device analyzes the relationship of a projected course of the vehicle and the direction of the movement of the object. When it is determined, on the basis of the relationship, that there is a possibility of interference between the vehicle and the object, the driver assistance device causes the vehicle to halt.

Autonomous emergency braking (AEB) devices are known as one of the functionalities of driver assistance devices. A vehicle equipped with such an AEB device is automatically brought to a halt where appropriate. Upon detection of a moving object in front of the vehicle, the AEB device determines, by calculation, the possibility of a collision between the vehicle and the moving object on the basis of a projected course of the moving object and a road to which the vehicle is directed. Examples of the moving object include pedestrians and bicycles. When determining that the vehicle is highly likely to come into collision with the moving object, the AEB device applies automatic braking to avoid a potential collision with the moving object. When determining that there is no possibility of collision, the AEB device allows the vehicle to keep driving.

An example of techniques for avoiding a collision between a vehicle and a moving object is disclosed in Japanese Unexamined Patent Application Publication (JP-A) No. 2017-140993. The technique is to be adopted into a vehicle to keep it from coming into collision with a moving object in front of it but also from coming into collision with a moving object near an intersection at which the vehicle makes a right-hand turn. When the vehicle crosses the opposite lane to make a right-hand turn at the intersection, it is determined whether there is a moving object (a pedestrian, in particular) crossing a road at a crosswalk ahead of the point at which the vehicle makes a right-hand turn. Upon detection of the moving object, automatic braking is applied to cause the vehicle to halt.

SUMMARY

An aspect of the disclosure provides a driver assistance device to be applied to a vehicle a time of a right-hand turn and at a time of a left-hand turn. The driver assistance device includes a vehicle-driving environment information acquiring unit, an intersection detecting unit, a right/left turn determining unit, a projected course setting unit, a moving object recognizing unit, a movement vector calculating unit, a meeting point calculating unit, and a halt control unit. The vehicle-driving environment information acquiring unit is configured to acquire information about vehicle-driving environment ahead of the vehicle. The intersection detecting unit is configured to detect an intersection in the information about the vehicle-driving environment. The right/left turn determining unit is configured to determine whether the vehicle makes the right-hand turn or the left-hand at the intersection when the intersection is detected by the intersection detecting unit. The projected course setting unit is configured to set a projected course of the vehicle when the right/left turn determining unit determines that the vehicle makes the right-hand turn or the left-hand at the intersection. The moving object recognizing unit is configured to recognize, based on the information about the vehicle-driving environment, a moving object ahead in a direction in which the vehicle making the right-hand turn or the left-hand turn is headed. The movement vector calculating unit is configured to calculate a movement vector from positional changes of the moving object recognized by the moving object recognizing unit. The meeting point calculating unit is configured to calculate a meeting point of a path of the moving object in a direction of the movement vector calculated by the movement vector calculating unit and the projected course set by the projected course setting unit. The halt control unit is configured to determine that there is a possibility of interference between the vehicle and the moving object and to bring the vehicle to a halt short of the meeting point when an interval between a first time at which the vehicle reaches the meeting point and a second time at which the moving object reaches the meeting point is determined to fall within a predetermined range is found to fall within a predetermined range. The first time and the second time are calculated by the meeting point calculating unit.

An aspect of the disclosure provides a driver assistance device to be applied to a vehicle at a time of a right-hand turn and at a time of a left-hand turn. The driver assistance device includes circuitry. The circuitry is configured to acquire information about vehicle-driving environment ahead of the vehicle. The circuitry is configured to detect an intersection in the information about the vehicle-driving environment. The circuitry is configured to determine whether the vehicle makes a right- or left-hand turn at the intersection when the intersection is detected. The circuitry is configured to, upon determining that the vehicle makes the right-hand turn or the left-hand turn at the intersection, set a projected course of the vehicle. The circuitry is configured to recognize, based on the information about the vehicle-driving environment, a moving object ahead in a direction in which the vehicle making the right-hand turn or the left-hand turn is headed. The circuitry is configured to calculate a movement vector from positional changes of the moving object. The circuitry is configured to calculate a meeting point of a path of the moving object in a direction of the movement vector and the projected course. The circuitry is configured to calculate a first time at which the vehicle reaches the meeting point and a second time at which the moving object reaches the meeting point. The circuitry is configured to determine that there is a possibility of interference between the vehicle and the moving object and to bring the vehicle to a halt short of the meeting point when an interval between the first time and the second time is determined to fall within a predetermined range.

BRIEF DESCRIPTION OF THE DRAWINGS

The accompanying drawings are included to provide a further understanding of the disclosure and are incorporated in and constitute a part of this specification. The drawings

DETAILED DESCRIPTION

Figure 1:
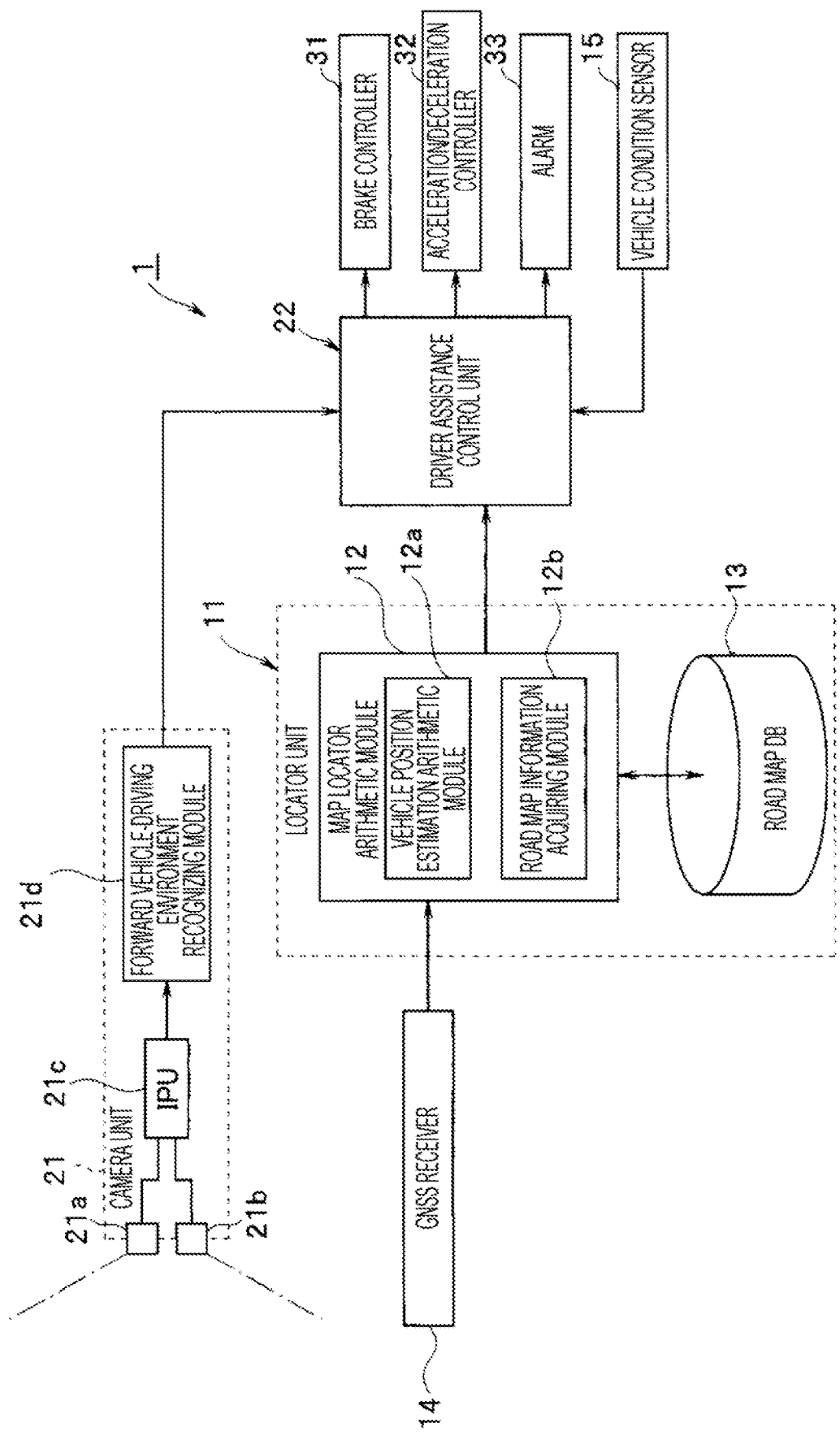
FIG. 1 is a schematic configuration diagram of a driver assistance device.

In the technique disclosed in JP-A No. 2017-140993, it is determined whether there is a moving object crossing a road at a crosswalk when a vehicle makes a right-hand turn, and the timing at which automatic braking is to be applied is determined on the basis of "time to collision (TTC)" upon detection of the moving object. In a case where an object moving on a sidewalk is yet to reach the crosswalk at the point in time when the vehicle makes a right-hand turn, the object will be detected on the crosswalk right after the vehicle turns right. As a result, automatic braking will be suddenly applied. This would give both the occupant and the moving object a fright.

There may be a case in which the road into which the vehicle making a right- or left-hand turn is headed is relatively narrow and does not have a crosswalk near the intersection. The absence of a crosswalk recognized on such a narrow road leads to a delay in detecting a moving object on the road. Thus, the vehicle makes a right-hand turn without recognizing the moving object, in which case automatic braking would be suddenly applied when the vehicle is immediately in front of the moving object. This would give both the occupant and the moving object (e.g., a pedestrian) a fright.

This is particularly true when the speed and/or the direction of the moving object (e.g., a pedestrian or a bicycle) changes while the moving object is crossing a road. For example, the speed of the moving object increases, and/or the moving object turns to a different direction and moves toward the vehicle. Such a change leads to a delay in applying automatic braking. Thus, it is likely that harsh braking is suddenly applied, and as a result, the occupant of the vehicle would experience discomfort.

The vehicle faces these problems not simply when making a (right-hand) turn by crossing the opposite lane but also when making a (left-hand) turn in the reverse direction.

It is desirable to provide a driver assistance device to be applied to vehicle at times of right- and left-hand turns. The driver assistance device can accurately predict whether the vehicle will interfere with a moving object that is crossing a road close to an intersection at which vehicle makes a right- or left-hand turn to head into the road. The driver assistance device is capable of making a prediction without giving both the occupant and the moving object a fright.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. The present embodiment is based on an example in which vehicles drive on the left side of a road according to the rules of the road. When vehicles are to drive on the right side of a road according to the rules of the road, "right" is read as "left", and vice versa.

Figure 3:
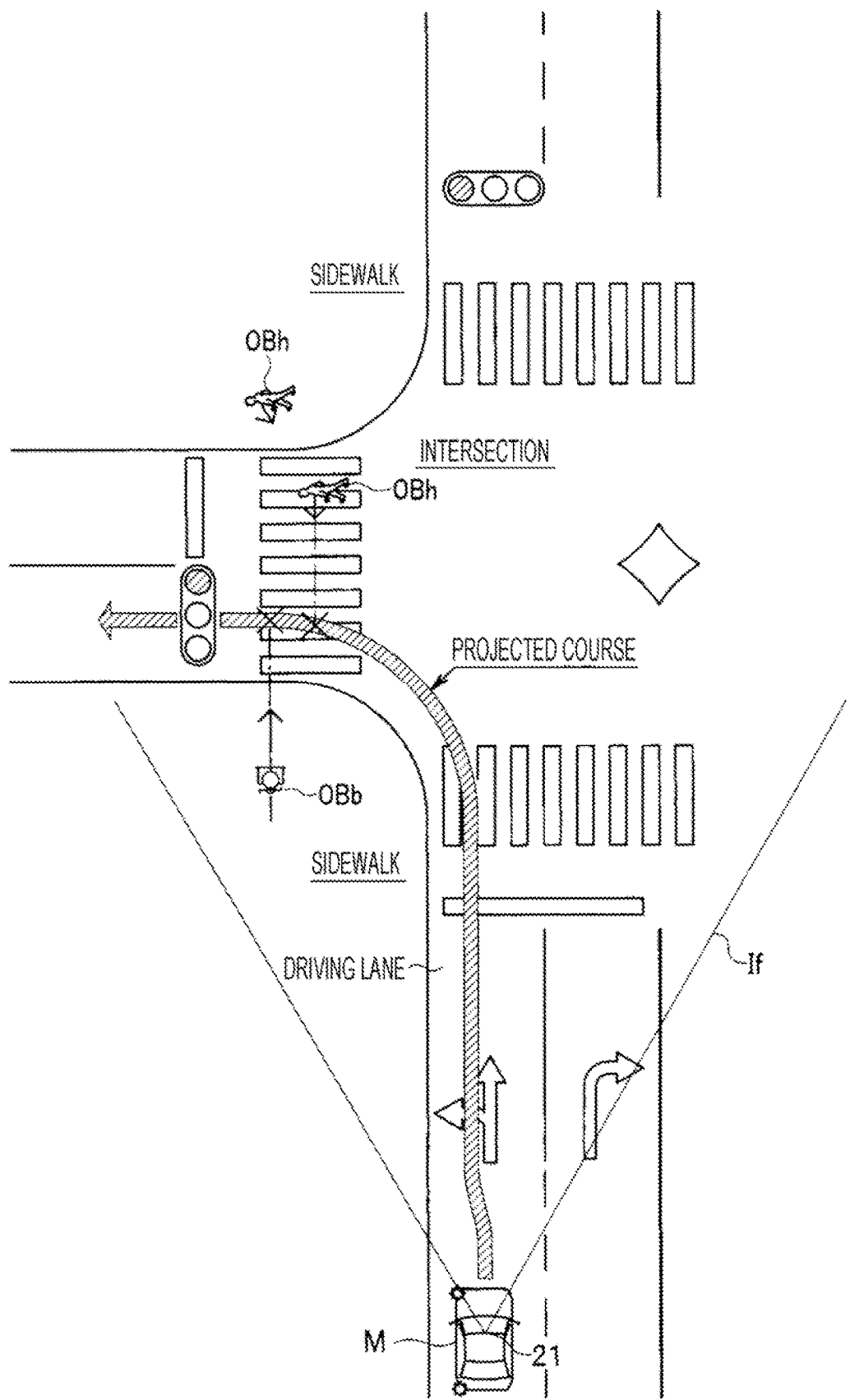
FIG. 3 is an overhead view of an intersection, illustrating a state in which moving objects are detected when a vehicle makes a left-hand turn.
Figure 4:
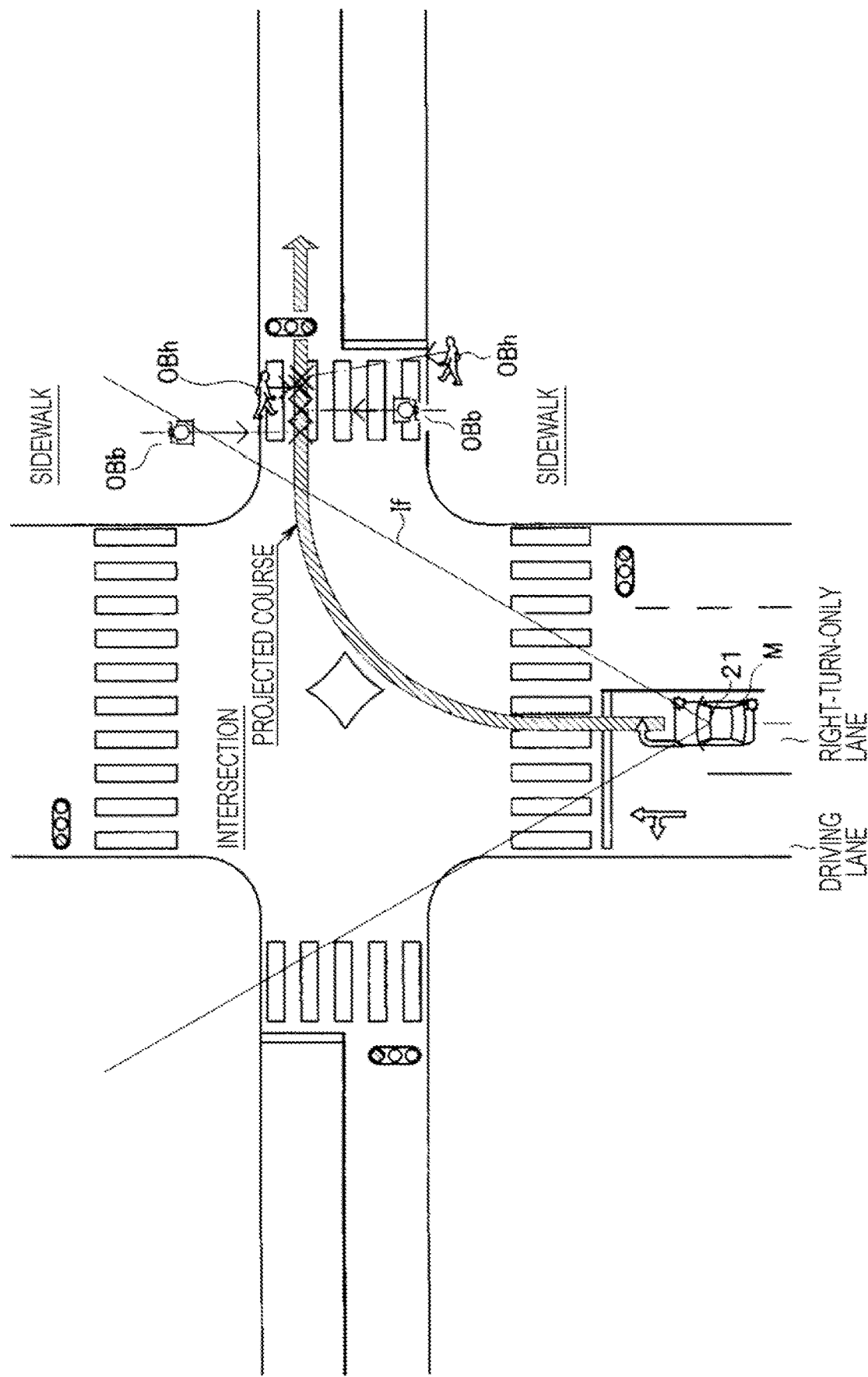
FIG. 4 is an overhead view of an intersection, illustrating a state in which moving objects are detected when a vehicle makes a right-hand turn.
Figure 5:
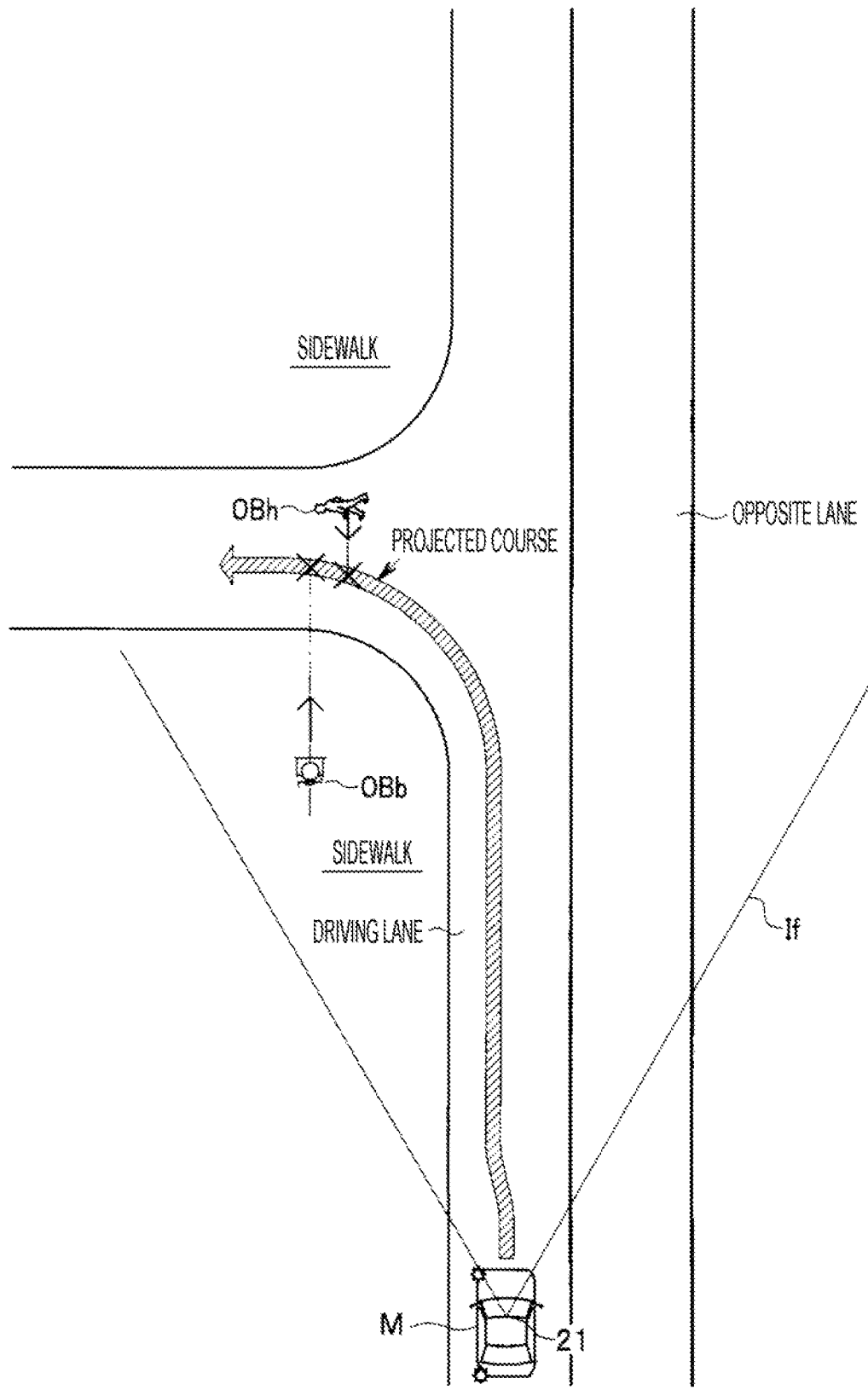
FIG. 5 is an overhead view of a T junction, illustrating a state in which moving objects are detected when a vehicle makes a left-hand turn.

A driver assistance device 1 in FIG. 1 is mounted on a vehicle M (see FIGS. 3 to 5). The driver assistance device 1 includes a locator unit 11, a camera unit 21, and a driver assistance control unit 22. In an embodiment, the driver assistance device 1 serves as a "driver assistance device" to be applied to a vehicle at times of right- and left-hand turns.

The locator unit 11 estimates the position of a vehicle M on a road map (a vehicle position) and acquires data about the road map of the region in which the vehicle M is located. The camera unit 21 acquires information about the vehicle-driving environment ahead of the vehicle M to obtain information on static objects and information on objects exhibiting dynamic behaviors. Examples of the static objects include: lines that define a lane (driving lane) in which the vehicle M is driving; the shape of the road; and a crosswalk. Examples of objects exhibiting dynamic behaviors include: vehicles ahead of the vehicle M; and pedestrians and bicycles crossing a road.

The locator unit 11 includes a map locator arithmetic module 12 and a road map database 13. The map locator arithmetic module 12 is a microcontroller including a CPU, RAM, ROM, rewritable nonvolatile memory (flash memory or EEPROM), and peripherals. The same holds for a forward vehicle-driving environment recognizing module 21*d* and the driver assistance control unit 22, which will be described later. The ROM stores programs and fixed data for use in the execution of various kinds of processing by the CPU. The RAM is a work area for the CPU. Various kinds of data for use by the CPU are temporarily stored in the RAM. CPUs are also known as microprocessors (MPUs) or processors. In place of CPUs, graphics processing units (GPUs) or graph streaming processors (GSPs) may be included. CPUs, GPUs, and GSPs may be included in varying combinations.

A Global Navigation Satellite System (GNSS) receiver 14 is coupled to the input of the map locator arithmetic module 12. The GNSS receiver 14 receives positional signals from positioning satellites.

The map locator arithmetic module 12 includes a vehicle position estimation arithmetic module 12*a* and a road map information acquiring module 12*b*. The vehicle position estimation arithmetic module 12*a* acquires positional information about the vehicle M on the basis of positional signals received by the GNSS receiver 14. The positional information is acquired in the form of position coordinates (latitude, longitude, and altitude).

The road map information acquiring module 12*b* estimates the position of the vehicle on the road map by map-matching, in which the position coordinates (latitude, longitude, and altitude of the position) of the vehicle M are matched on road maps stored in the road map database 13. The road map database 13 is a mass-storage medium, such as a hard disk drive (HDD). Road map information is stored in the road map database 13. The road map information may include positional information about intersections and crosswalks.

The camera unit 21 is fixed to the upper midsection of the front part of the interior of the vehicle M. The camera unit 21 includes an on-board camera, an image processing unit (IPU) 21c, and the forward vehicle-driving environment recognizing module 21d. The on-board camera (stereo camera) includes a main camera 21a and a sub-camera 21b. The cameras 21a and 21b are symmetrically placed at the right and left of the midpoint of the width of the vehicle. The cameras 21a and 21b have a predetermined base line length therebetween. The cameras 21a and 21b are wide-angle cameras (see dash-dot lines in FIG. 1) such that an image of a wide region located immediately in front of the vehicle M and extending from side to side in the direction of the width of the vehicle can be projected for recording.

The camera unit 21 operates as follows: the cameras 21a and 21b project an image of a predetermined imaging field If (see FIGS. 3 to 5) in front of the vehicle M for recording vehicle-driving environment image information, and the IPU 21c then performs image processing on the vehicle-driving environment image information in a predetermined manner. After undergoing the image processing performed by the IPU21c, the vehicle-driving environment image information is fetched by the forward vehicle-driving environment recognizing module 21d, which then uses the vehicle-driving environment image information to find and acquire the forward vehicle-driving environment information. Examples of the forward vehicle-driving environment information to be acquired include: the shape of a road on which the vehicle M is traveling (the road curvature (1/m) at a middle line that divides the road into a right lane and a left lane and the distance between two division lines that define the right or left lane (the vehicle width); stationary objects (e.g., intersections, traffic signs, and crosswalks); moving objects (e.g., pedestrians and bicycles) that are crossing a road; vehicles ahead of the vehicle M; and oncoming vehicles in the opposite lane.

In some embodiments, the camera unit 21 is a monocular camera, in which the main camera 21a is used alone without the aid of the sub-camera 21b. In place of the sub-camera 21b, an ultrasonic sensor, a millimeter-wave radar, a microwave radar, an infrared sensor, a laser radar, a Light Detection and Ranging (LiDAR) instrument, or a combination of two or more of these is adopted to search a wide area ahead of the vehicle M such that the forward vehicle-driving environment recognizing module 21d can obtain the forward vehicle-driving environment information.

The map locator arithmetic module 12, the forward vehicle-driving environment recognizing module 21d of the camera unit 21, and a vehicle condition sensor 15 are coupled to the input of the driver assistance control unit 22. The vehicle condition sensor 15 refers to a group of sensors capable of grasping various conditions relevant to the vehicle M. Examples of the sensors include: a vehicle speed sensor capable of determining the speed of the vehicle M (vehicle speed); a steering angle sensor capable of determining the steering angle of the vehicle M; an accelerator pedal depression sensor capable of determining the depression amount of the accelerator pedal; a brake light switch designed to turn on by depression of the brake pedal; and signals from turn signal switches capable of turning on or off the right and left indicators.

A brake controller 31, an acceleration/deceleration controller 32, and an alarm 33 are coupled to the output of the driver assistance control unit 22. The brake controller 31 causes the vehicle M to decelerate through forced braking. The acceleration/deceleration controller 32 controls power that is to be output from a driving source (an engine or an electric motor) installed in the vehicle M. The alarm 33 provides information to the driver by voice or image, as necessary.

On the basis of the forward vehicle-driving environment information obtained by the forward vehicle-driving environment recognizing module 21d of the camera unit 21, the driver assistance control unit 22 detects an intersection ahead of the vehicle M and the presence or absence of a moving object that is crossing or about to cross a road located in the direction in which the vehicle M is headed (see FIGS. 3 to 5). The moving object is hereinafter denoted by OB. The information about the intersection may be retrieved from the road map information acquired by the road map information acquiring module 12b of the map locator arithmetic module 12.

When detecting an intersection ahead of the vehicle M, the driver assistance control unit 22 determines whether the vehicle M makes a right-hand turn or a left-hand turn (a "right- or left-hand turn" for short). When determining that the vehicle M makes a right- or left-hand turn, the driver assistance control unit 22 acquires information about the environment ahead of the point at which the vehicle M makes a right- or left hand turn. The driver assistance control unit 22 acquires the information from the forward vehicle-driving environment recognizing module 21d and also acquires, if necessary, the information from the road map information acquiring module 12b of the map locator arithmetic module 12.

When detecting the moving object OB that is crossing or about to cross the road, the driver assistance control unit 22 checks the relative positions of the vehicle M and the moving object OB and their speeds to see whether the vehicle M can possibly interfere with the moving object OB. When necessary, the driver assistance control unit 22 provides driver assistance. Referring to FIGS. 3 to 5, pedestrians OBh and bicycles OBb are illustrated as examples of the moving object OB.

Figure 2A:
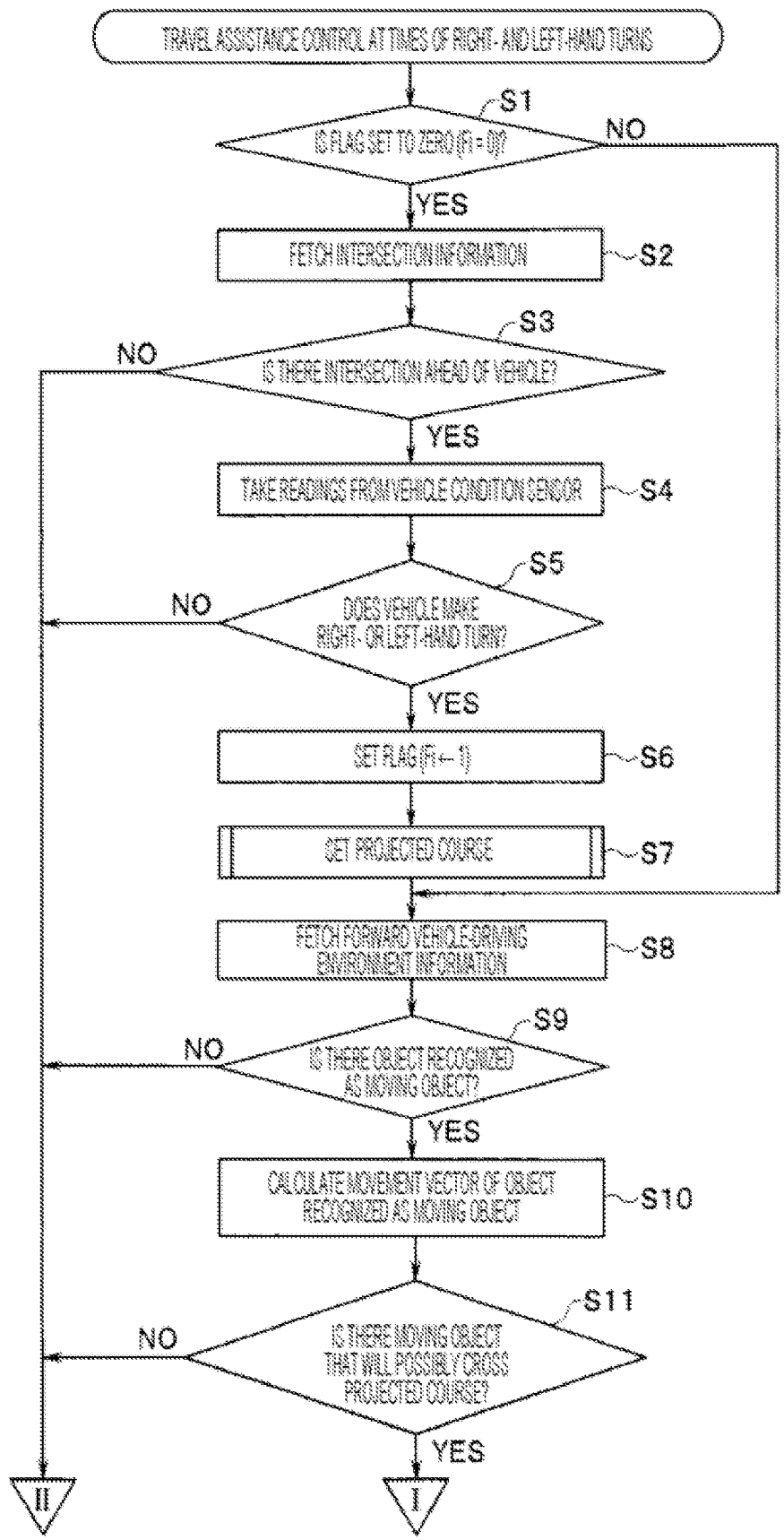
FIG. 2A is Part 1 of a flowchart of a travel assistance control routine at times of right- and left-hand turns.
Figure 2B:
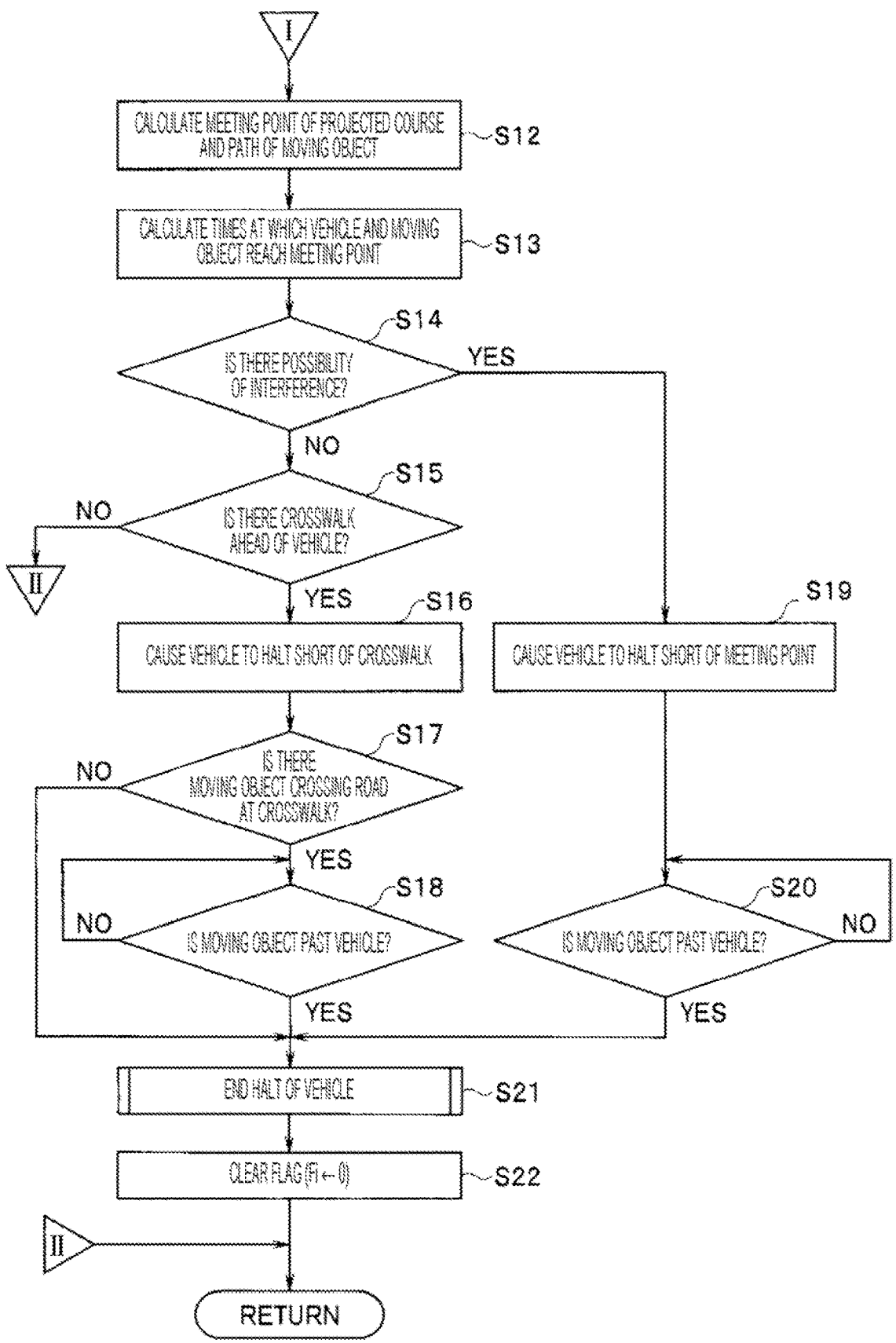
FIG. 2B is Part 2 of the flowchart of the travel assistance control routine at times of right- and left-hand turns.

The driver assistance control unit 22 provides the driver assistance at times of right- and left-hand turns by executing a travel assistance control routine at times of right- and left-hand turns (see FIGS. 2A and 2B). Once the system is started up, the routine is executed in cycles in accordance with a predetermined period of arithmetic operations. In Step S1, the value of Fi is checked. Fi denotes an intersection right/left-hand turn flag. The intersection right/left-hand turn flag Fi is used to determine whether the vehicle M makes or is about to make a right-hand or left-hand turn at an intersection. The initial value of the flag Fi is 0. The flag Fi is set in Step S6 (Fi←1), and the flag Fi is cleared in Step S22 (Fi←0). Steps S6 and S22 will be described later.

If the vehicle M is yet to make a right- or left-hand turn (Fi=0), the routine is exited. If the vehicle M makes or is about to make a right- or left-hand turn Fi=1), progression to Step S2 occurs. In Step S2, intersection information regarding the presence or absence of an intersection within a distance of several dozen meters ahead of the vehicle M is fetched. The intersection information is acquired from the forward vehicle-driving environment information obtained by the forward vehicle-driving environment recognizing module 21d of the camera unit 21. In some embodiments, the information about the intersection may be retrieved from the road map information fetched by the road map information acquiring module 12b of the map locator arithmetic module 12. In one embodiment, the forward vehicle-driving environment recognizing module 21d or the road map information acquiring module 12b may serve as a "vehicle-driving environment information acquiring unit".

Step S2 is followed by Step S3, in which it is determined whether there is an intersection ahead of the vehicle M. The determination is made on the basis of the intersection information. In an embodiment, Steps S2 and S3 are the processing executed by an "intersection detecting unit".

If it is determined that there is an intersection ahead of the vehicle M, progression to Step S4 occurs. If it is determined that there is no intersection ahead of the vehicle M, the routine is exited. Examples of the intersection include a crossroad (see FIGS. 3 and 5) and a T-junction (see FIG. 4).

Step S4 is the read-in of an output value from the vehicle condition sensor 15 and is followed by Step S5. In Step S5, it is determined whether the vehicle M makes a right- or left-hand turn at the intersection. The determination is made on the basis of the output value obtained from the vehicle condition sensor 15. In an embodiment, Step S5 is the processing executed by a "right/left turn determining unit".

A determination on whether the vehicle M makes a right- or left-hand turn at the intersection is made on the satisfaction of the following conditions: (1) a right-hand turn signal switch or a left-turn signal switch is turned on; (2) the steering angle determined by the steering angle sensor is shifted temporarily in the direction indicated by the turn signal switch turned to the ON position; and (3) variations in the vehicle speed determined by the vehicle speed sensor are indicative of deceleration of the vehicle M. If all of the conditions (1) to (3) are satisfied, it is determined that the vehicle M is to make a (right- or left-hand) turn in the direction indicated by the turn signal switch turned to the ON position. Then, progression to Step S6 occurs. If one or more of the conditions (1) to (3) are not satisfied, it is determined that the vehicle M does not make a right- or left-hand turn. Then, the routine is exited.

The intersection right/left-hand turn flag Fi is set (Fi←1) in Step S6, which is followed by Step S7. In Step S7, the driver assistance control unit 22 sets a projected course of the vehicle M. For example, the projected course of the vehicle M is an imaginary line connecting the midpoint of the width of the vehicle M in the current position and the midpoint of the width of the lane ahead of the point at which the vehicle M makes a right- or left-hand turn. The turning radius of the vehicle M takes on varying values according to the direction (right or left) of the turn at the intersection. In an embodiment, Step S7 is the processing executed by a "projected course setting unit".

An example of the projected course of the vehicle M at the time of a left-hand turn is illustrated in FIGS. 3 and 5, in which the left rear wheel of the vehicle M on the projected course at the intersection is to pass through a point located at a predetermined distance from the curb of the driving lane in which the vehicle M is driving. Thus, the turning radius of the vehicle M at the time of a left-hand turn at an intersection on the projected course is set such that the circumference of the turning circle passes through points whose distance from the curb is obtained by adding one-half of the width of the vehicle M to the predetermined distance between the curb and the left rear wheel.

An example of the projected course of the vehicle M at the time of a right-hand turn is illustrated in FIG. 4, in which the left front wheel of the vehicle M on the projected course is to pass through points located on the inner side with respect to the midpoint of the intersection. Thus, the turning radius of the vehicle M at the time of a right-hand turn at an intersection on the projected course is set such that the circumference of the turning circle passes through points whose distance from the center of the turning circle is obtained by subtracting one-half of the width of the vehicle M from the distance between the center of the turning circle and the left front wheel at a predetermined distance from the midpoint of the intersection. At the point in time when progression to Step S7 occurs during the execution of the program, the vehicle M is about to enter the intersection at reduced speed (at speeds in a range of 10 to 20 Km/h).

The Step S7 is followed by Step S8, in which the forward vehicle-driving environment information obtained by the forward vehicle-driving environment recognizing module 21d of the camera unit 21 is fetched. Then, progression to Step S9 occurs. In Step S9, it is determined whether there is an object recognized as the moving object OB on or near a road close to the intersection at which the vehicle M makes a right- or left-hand turn to head into the road. The check is made on the basis of the forward vehicle-driving environment information. If there is an object recognized as the moving object OB, progression to Step S10 occurs. If there is an object recognized as the moving object OB, the routine is exited. In an embodiment, Steps S8 and S9 are the processing executed by a "moving object recognizing unit".

In Step S10, the movement vector (the direction of movement and the speed) of the moving object OB is calculated from positional changes of the moving object OB. The positional changes are detected at every arithmetic operation period. Arrows in FIGS. 3 to 5 denote the movement vectors of the pedestrians OBh and the bicycles OBb, which are illustrated as examples of the moving object OB. In an embodiment, Step S10 is the processing executed by a "movement vector calculating unit".

Step S10 is followed by Step S11, in which it is determined whether any of the objects recognized as the moving objects OB will possibly cross the projected course of the vehicle M. The determination is made on the basis of the directions of the movement vectors of the moving objects OB. If it is determined that none of the directions of the movement vectors of the moving objects OB will intersect the projected course, the routine is exited.

If it is determined that the direction of the movement vector of at least one of the moving objects OB will possibly intersect the projected course, progression to Step S12 occurs. In Step S12, a meeting point of the projected course of the vehicle M and the direction of the movement vector of the moving object OB is determined. Referring to FIGS. 3 to 5, meeting points are each marked with ×. In an embodiment, Steps S11 and S12 are the processing executed by a "meeting point calculating unit".

Step S12 is followed by Step S13, in which the time at which the vehicle M reaches the meeting point is calculated. The time is calculated from the vehicle speed and the length of the route from the current position of the vehicle M on the projected course to the meeting point. Likewise, the time at which the moving object OB reaches the meeting point is calculated. The time is calculated from the current speed of the moving object OB and the distance between the moving object OB and the meeting point. When approaching the meeting point, the vehicle M travels at reduced speed; that is, the vehicle speed is in a range of 10 to 20 Km/h.

The speed of the pedestrian OBh and the speed of the bicycle OBb change constantly. Thus, the movement vector of the moving object OB changes at every arithmetic operation period. The time at which the vehicle M reaches the meeting point and the time at which the moving object OB reaches the meeting point change at every arithmetic operation period accordingly. As with the meeting point of the projected course of the vehicle M and the direction of the movement vector of the moving object OB, the times at which the vehicle M and the moving object OB reach the meeting point are determined at every arithmetic operation period to keep track of behavioral changes of the moving object OB.

Step S13 is followed by Step S14, in which it is determined whether the interval between the times calculated in Step S13 (the times at which the vehicle M and the moving object OB reach the meeting point) is within a predetermined range (e.g., within a range of 2 to 3 seconds). If the interval between the times at which the vehicle M and the moving object OB reach the meeting point is found to be out of the predetermined range, it is determined that the vehicle M is unlikely to interfere with the moving object OB. Then, progression to Step S15 occurs. If the interval between the times at which the vehicle M and the moving object OB reach the meeting point is found to fall within the predetermined range, it is determined that the vehicle M is highly likely to interfere with the moving object OB. Then, branching to Step S19 occurs.

In Step S15, it is determined whether there is a crosswalk being close to the intersection and located on a road into which the vehicle M making a right- or left-hand turn is headed. The presence or absence of a crosswalk is determined on the basis of the forward vehicle-driving environment information obtained by the forward vehicle-driving environment recognizing module 21d of the camera unit 21 or the road map information fetched by the road map information acquiring module 12b of the map locator arithmetic module 12. If it is determined that there is a crosswalk ahead of the vehicle M, progression to Step S16 occurs. If no crosswalk is detected, the routine is exited.

In Step S16, the vehicle M is brought to a halt short of reaching the crosswalk ahead of the point at which the vehicle M makes a right- or left-hand turn. Then, progression to Step S17 occurs. In order to cause the vehicle M to halt short of the crosswalk, the driver assistance control unit 22 causes the brake controller 31 and the acceleration/deceleration controller 32 to perform control actions on the basis of the vehicle speed and the distance between the vehicle M and the crosswalk.

In Step S17, it is determined whether there is an object recognized as the moving object OB that is crossing or about to cross the road at the crosswalk. The determination is made on the basis of the forward vehicle-driving environment information obtained by the forward vehicle-driving environment recognizing module 21d of the camera unit 21. If there is an object recognized as the moving object OB that is crossing or about to cross the crosswalk, progression to Step S18 occurs. If there is no object recognized as the moving object OB that is crossing or about to cross the crosswalk, progression to Step S21 occurs.

In Step S18, it is determined whether the moving object OB has passed the front of the vehicle M. The determination is made on the basis of the forward vehicle-driving environment information obtained by the forward vehicle-driving environment recognizing module 21d of the camera unit 21. The brake controller 31 controls the brakes to cause the vehicle M to keep halting until the moving object OB in front is past the vehicle M. If it is recognized, from the forward vehicle-driving environment information obtained by the camera unit 21, that the moving object OB in front is past the vehicle M, progression to Step S21 occurs.

If it is determined that the vehicle M is highly likely to interfere with the moving object OB in Step S14 and branching to Step S19 occurs, the vehicle M is brought to a halt short of reaching the meeting point. Then, progression to Step S20 occurs. In order to cause the vehicle M to halt short of the meeting point, the driver assistance control unit 22 causes the brake controller 31 and the acceleration/deceleration controller 32 to perform control actions on the basis of the vehicle speed and the distance between the vehicle M and a point located short of the meeting point (e.g., a point located one to two meters short of the meeting point).

In Step S20, the brake controller 31 controls the brakes to cause the vehicle M to keep halting until the moving object OB in front is past the vehicle M; that is, Step S20 is analogous to Step S18. If it is recognized that the moving object OB in front is past the vehicle M, progression to Step S21 occurs.

Step S18 and Step S20 are each followed by Step S21, in which halt end control is performed. Then, progression to Step S22 occurs. In order to end the halt of the vehicle M, the driver assistance control unit 22 equipped with well-known adaptive cruise control (ACC) with follow-up function causes the alarm 33, the brake controller 31, and the acceleration/deceleration controller 32 to exercise control in the following manner. The driver is prompted to drive off, following the voice guidance given by the alarm 33. The brake controller 31 then releases the brakes, and the acceleration/deceleration controller 32 causes the vehicle M to start moving at low speed. Alternatively, the brake controller 31 may release to brakes when the driver steps on the accelerator pedal after the driver is prompted to drive off, following the voice guidance given by the alarm 33. Then, progression to Step S22 occurs. In an embodiment, Steps S15 to S21 are the processing executed by a "halt control unit".

In Step S22, the intersection right/left-hand turn flag Fi is cleared (Fi←0). Then, the routine is exited.

The driver assistance control unit 22 in the present embodiment sets a projected course of the vehicle M and calculates the movement vector of the vehicle M when the vehicle M makes a right- or left-hand turn at an intersection. With the start point being the current position of the vehicle M, the projected course leads to a road into which the vehicle M making a right- or left-hand turn is headed. The movement vector is calculated from positional changes of the moving object OB passing ahead of the point at which the vehicle M makes a right- or left-hand turn. When the direction of the movement vector intersects the projected course, it is recognized that the moving object OB is crossing over the projected course.

Then, the meeting point (marked with × in FIGS. 3 to 5) at which the direction of the movement vector of the moving object OB intersects the projected course is determined at every arithmetic operation period. If the interval between the times at which the vehicle M and the moving object OB reach the meeting point is found to fall within the predetermined range, it is determined that the vehicle M is highly likely to interfere with the moving object OB. The vehicle M is then brought to a halt short of reaching the meeting point.

The vehicle M is thus kept from coming into collision with a moving object that is crossing a road close to an intersection at which the vehicle M makes a right- or left-hand turn to head into the road. The meeting point is successively recalculated while the movement vector of the moving object OB varies. For example, the movement vector varies when the speed of the moving object OB increases, and/or the moving object OB turns to a different direction and moves toward the vehicle. This feature enables precise estimation of the meeting point at which the vehicle M will interfere with the moving object OB. Thus, any sudden braking or the like that would give the occupant and the moving object a fright can be successfully avoided.

The disclosure is not limited to the embodiment described above. For example, the term "moving object OB" may refer to not simply the pedestrian OBh and the bicycle OBb but also other objects moving from a sidewalk to cross a road.

The forward vehicle-driving environment recognizing module 21d, the map locator arithmetic module 12, and the driver assistance control unit 22 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the forward vehicle-driving environment recognizing module 21d, all or a part of functions of the map locator arithmetic module 12 including the vehicle position estimation arithmetic module 12a and the road map information acquiring module 12b, and all or a part of the functions of the driver assistance control unit 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driver assistance device to be applied to a vehicle at a time of a right-hand turn and at a time of a left-hand turn, the driver assistance device comprising:
    a vehicle-driving environment information acquiring unit configured to acquire information about vehicle-driving environment ahead of the vehicle;
    an intersection detecting unit configured to detect an intersection in the information about the vehicle-driving environment;
    a right/left turn determining unit configured to determine whether the vehicle makes the right-hand turn or the left-hand turn at the intersection when the intersection is detected by the intersection detecting unit;
    a projected course setting unit configured to set a projected course of the vehicle when the right/left turn determining unit determines that the vehicle makes the right-hand turn or the left-hand turn at the intersection;
    a moving object recognizing unit configured to recognize, based on the information about the vehicle-driving environment, a moving object ahead in a direction in which the vehicle making the right-hand turn or the left-hand turn is headed;
    a movement vector calculating unit configured to calculate a movement vector from positional changes of the moving object recognized by the moving object recognizing unit;
    a meeting point calculating unit configured to calculate a meeting point of a path of the moving object in a direction of the movement vector calculated by the movement vector calculating unit and the projected course set by the projected course setting unit; and
    a halt control unit configured to determine that there is a possibility of interference between the vehicle and the moving object and to bring the vehicle to a halt before reaching the meeting point when an interval between a first time at which the vehicle reaches the meeting point and a second time at which the moving object reaches the meeting point is determined to fall within a predetermined range, the first time and the second time being calculated by the meeting point calculating unit,
    wherein the halt control unit is further configured to:
        in response to determining that there is no possibility of the interference between the vehicle and the moving object, determine whether there is a crosswalk adjacent to the intersection and located on a road into which the vehicle turns right or left, based on the information about the vehicle-driving environment; and
        in response to determining that there is the crosswalk ahead of the vehicle, bring the vehicle to a halt before reaching the crosswalk.

2. The driver assistance device according to claim 1, wherein the halt control unit is configured to end the halt of the vehicle, when passage of the moving object in front of the vehicle is detected based on the information about the vehicle-driving environment.

3. The driver assistance device according to claim 1, wherein the halt control unit is configured to end the halt short of the crosswalk of the vehicle, when the moving object crossing the road at the crosswalk is not detected based on the information about the vehicle-driving environment.

4. The driver assistance device according to claim 1, wherein the halt control unit is configured to cause the vehicle to keep the halt short of the crosswalk until the moving object in front has passed the vehicle, when the moving object about to cross the road at the crosswalk is detected based on the information about the vehicle-driving environment.

5. A driver assistance device to be applied to a vehicle at a time of a right-hand turn and at a time of a left-hand turn, the driver assistance device comprising circuitry configured to:
    acquire information about vehicle-driving environment ahead of the vehicle;
    detect an intersection in the information about the vehicle-driving environment;
    determine whether the vehicle makes a right- or left-hand turn at the intersection when the intersection is detected;
    upon determining that the vehicle makes the right-hand turn or the left-hand turn at the intersection, set a projected course of the vehicle;
    recognize, based on the information about the vehicle-driving environment, a moving object ahead in a direction in which the vehicle making the right-hand turn or the left-hand turn is headed;
    calculate a movement vector from positional changes of the moving object;
    calculate a meeting point of a path of the moving object in a direction of the movement vector and the projected course;
    calculate a first time at which the vehicle reaches the meeting point and a second time at which the moving object reaches the meeting point; and determine that there is a possibility of interference between the vehicle and the moving object and bring the vehicle to a halt short of the meeting point when an interval between the first time and the second time is determined to fall within a predetermined range;

in response to determining that there is no possibility of the interference between the vehicle and the moving object, determine whether there is a crosswalk adjacent to the intersection and located on a road into which the vehicle turns right or left, based on the information about the vehicle-driving environment; and in response to determining that there is the crosswalk ahead of the vehicle, bring the vehicle to a halt before reaching the crosswalk.

* * * * *